United States Patent
Liao et al.

(10) Patent No.: US 9,313,017 B1
(45) Date of Patent: Apr. 12, 2016

(54) BAUD-RATE CDR CIRCUIT AND METHOD FOR LOW POWER APPLICATIONS

(71) Applicant: Xilinx, Inc., San Jose, CA (US)

(72) Inventors: Yu Liao, Longmont, CO (US); Geoffrey Zhang, San Jose, CA (US); Hongtao Zhang, San Jose, CA (US); Zhaoyin D. Wu, San Jose, CA (US); Kun-Yung Chang, San Jose, CA (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 14/737,330

(22) Filed: Jun. 11, 2015

(51) Int. Cl.
*H04L 7/00* (2006.01)
*H04L 7/033* (2006.01)

(52) U.S. Cl.
CPC ............ *H04L 7/0087* (2013.01); *H04L 7/0029* (2013.01); *H04L 7/0331* (2013.01)

(58) Field of Classification Search
CPC .. H04B 7/0845; H04B 1/0017; H04L 27/148; H04L 27/2334; H04L 27/1566; H04L 25/03; H04L 27/01; H04L 25/03019; H04L 25/03057; H04L 2025/0349; H04L 2025/03509; H04L 7/0029
USPC .................. 375/229–234, 326–327, 350, 355
See application file for complete search history.

(56) References Cited

U.S. PATENT DOCUMENTS

| | | | | |
|---|---|---|---|---|
| 6,067,319 | A * | 5/2000 | Copeland ...................... | 375/232 |
| 6,728,894 | B2 * | 4/2004 | McEwen ................ | H03L 7/091 713/400 |
| 6,810,485 | B2 * | 10/2004 | McEwen .......... | G11B 20/10296 713/400 |
| 7,333,532 | B2 * | 2/2008 | Baltersee et al. ............. | 375/148 |
| 7,440,499 | B2 * | 10/2008 | Schenk ......................... | 375/234 |
| 7,515,369 | B2 * | 4/2009 | Sugawara ................ | G11B 5/09 360/51 |
| 7,545,861 | B2 * | 6/2009 | Seo ............................... | 375/233 |
| 7,551,668 | B2 * | 6/2009 | Higashino ......... | H04L 25/03261 375/230 |
| 7,653,125 | B2 * | 1/2010 | Kajiwara ...................... | 375/229 |
| 8,120,395 | B2 * | 2/2012 | Williams et al. .............. | 327/156 |
| 8,218,612 | B2 * | 7/2012 | Chien et al. ................... | 375/226 |
| 8,219,339 | B2 * | 7/2012 | Hamre ................... | G01R 29/26 702/69 |
| 8,279,989 | B2 * | 10/2012 | Shen ....................... | H03L 7/091 375/216 |
| 8,441,751 | B1 * | 5/2013 | Song et al. ...................... | 360/45 |
| 8,594,254 | B2 * | 11/2013 | Lee .................... | H03H 17/0657 375/260 |
| 8,605,847 | B2 * | 12/2013 | Mobin et al. .................. | 375/355 |
| 8,649,476 | B2 * | 2/2014 | Malipatil et al. .............. | 375/355 |
| 8,737,847 | B2 * | 5/2014 | Li et al. ......................... | 398/202 |
| 8,934,594 | B1 * | 1/2015 | Malhotra ....................... | 375/355 |
| 8,989,329 | B2 * | 3/2015 | Hammad et al. .............. | 375/355 |
| 9,048,999 | B2 * | 6/2015 | He et al. | |
| 9,154,234 | B2 * | 10/2015 | Motley ................... | H04B 10/80 |
| 2005/0094754 | A1 * | 5/2005 | Serizawa ...................... | 375/350 |
| 2013/0058391 | A1 * | 3/2013 | Hou ............................... | 375/232 |
| 2014/0169438 | A1 * | 6/2014 | Lin et al. ....................... | 375/232 |

(Continued)

*Primary Examiner* — Emmanuel Bayard
(74) *Attorney, Agent, or Firm* — Robert M. Brush

(57) ABSTRACT

In an example, a clock data recovery (CDR) circuit for a receiver includes a timing error detector circuit, a loop filter, and a phase interpolator. The timing error detector circuit is coupled to receive, at a baud-rate, data samples and error samples for symbols received by the receiver. The timing error detector circuit is operable to generate both a timing error value and an estimated waveform value per symbol based on the data samples and the error samples. The loop filter is coupled to the timing error detector to receive timing error values. The phase interpolator is coupled to the loop filter to receive filtered timing error values, the phase interpolator operable to generate a control signal to adjust a sampling phase used to generate the data samples and the error samples.

20 Claims, 4 Drawing Sheets

(56) References Cited

U.S. PATENT DOCUMENTS

2014/0177699 A1* 6/2014 Tan et al. .............. 375/233
2014/0245111 A1* 8/2014 Choi et al. .............. 714/776
2014/0328377 A1* 11/2014 Nakadaira .............. 375/146
2015/0010047 A1* 1/2015 Zhong et al. .............. 375/233
2015/0180642 A1* 6/2015 Hsieh et al.

\* cited by examiner

BAUD-RATE CDR CIRCUIT AND METHOD FOR LOW POWER APPLICATIONS

TECHNICAL FIELD

Examples of the present disclosure generally relate to electronic circuits and, in particular, to a baud-rate clock data recovery (CDR) circuit for low power applications.

BACKGROUND

Clock data recovery (CDR) is an important block in a receiver system for high-speed serial communications. The CDR block generates the correct sampling clock phase for data recovery. The quality of the high-speed serial communication link can be sensitive to the sampling dock phase, especially in the presence of jitter and noise.

One type of existing CDR is an edge-sampled CDR. An edge-sampled CDR oversamples the analog input waveform to generate the correct data sampling dock and recover the transmitted data. The edge-sampled CDR assumes the data to be sampled as around the center between zero-crossing points. The resulting oversampled system consumes more clocking power than a system operating at the symbol rate (also referred to as baud-rate). Further, as the channel loss profile changes, the analog waveform to be sampled is not necessarily symmetric. Thus, maintaining the data sampling dock at the center between zero-crossing points can be sub-optimal.

SUMMARY

Techniques for providing baud-rate clock data recovery (CDR) for low power applications are described. In an example, a clock data recovery (CDR) circuit for a receiver includes a timing error detector circuit, a loop filter, and a phase interpolator. The timing error detector circuit is coupled to receive, at a baud-rate, data samples and error samples for symbols received by the receiver. The timing error detector circuit is operable to generate both a timing error value and an estimated waveform value per symbol based on the data samples and the error samples. The loop filter is coupled to the timing error detector to receive timing error values. The phase interpolator is coupled to the loop filter to receive filtered timing error values, the phase interpolator operable to generate a control signal to adjust a sampling phase used to generate the data samples and the error samples.

In another example, a receiver includes a continuous-time equalizer circuit coupled to receive an analog signal from a channel. The receiver further includes a decision circuit coupled to receive an equalized analog signal from the continuous-time equalizer and to generate data samples and error samples of the equalized analog signal at a baud-rate of symbols of the analog signal. The receiver further includes a CDR circuit. The CDR circuit includes a timing error detector circuit coupled to receive the data samples and the error samples. The timing error detector circuit is operable to generate both a timing error value and an estimated waveform value per symbol of the analog signal based on the data samples and the error samples. The CDR circuit further includes a loop filter coupled to the timing error detector to receive timing error values. The CDR circuit further includes a phase interpolator coupled to the loop filter to receive filtered timing error values, the phase interpolator operable to provide a control signal to the decision circuit for adjusting a sampling phase used to generate the data samples and the error samples.

In another example, a method of clock data recovery for a receiver includes: receiving, at a baud-rate, data samples and error samples for symbols of an analog signal received by the receiver; generating both a timing error value and an estimated waveform value per symbol based on the data samples and the error samples; filtering each timing error value; and generating a control signal to adjust sampling phase used to generate the data samples and the error samples based on filtered timing error values.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
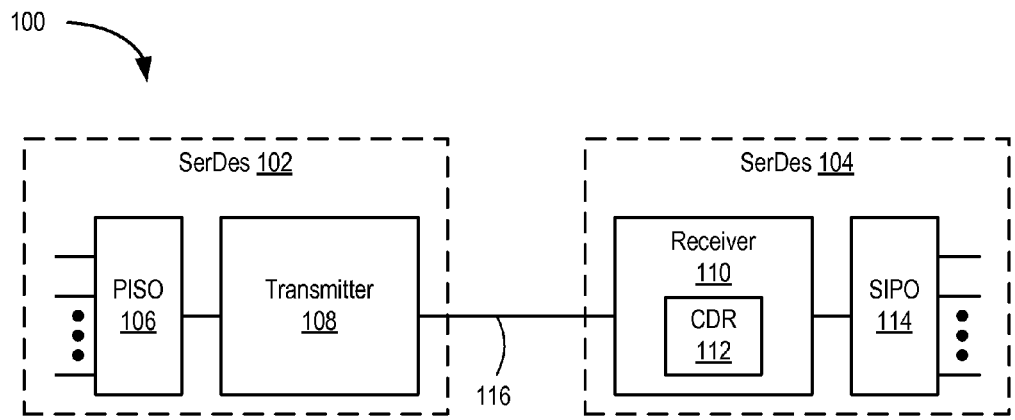
FIG. 1 is a block diagram depicting an example communication system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Techniques for providing baud-rate clock data recovery (CDR) for low power applications are described. A CDR circuit is disclosed that provides for robust CDR for use in low-power serial link communications. The CDR circuit can be used in receivers that do not include a high-speed analog-to-digital converter (ADC) and digital equalizer(s). The CDR circuit operates at the baud-rate of the symbols and does not require oversampling of the analog input signal, which reduces clocking power. The CDR circuit achieves near optimal sampling phase even as the channel loss profile changes. These and other aspects of the disclosed CDR circuit are described below.

FIG. 1 is a block diagram depicting an example communication system 100. The communication system 100 comprises a transmitter 108 coupled to a receiver 110 via a channel 116. In an example, the transmitter 108 is a part of a serializer/deserializer (SerDes) 102, and the receiver 110 is part of a SerDes 104. For clarity, the deserialization circuitry is omitted from the SerDes 102, and the serialization circuitry is omitted from the SerDes 104. The SerDes 102 includes a parallel-in-serial-out (PISO) circuit 106 that converts parallel input data to serial output data for transmission over the channel 116 by the transmitter 108. The SerDes 104 includes a serial-in-parallel-out (SIPO) circuit that converts serial data output by the receiver 110 to parallel output data. The SerDes 102 and the SerDes 104 can include other circuitry (not shown), such as decoders, encoders, and the like.

While the SerDes 102 and the SerDes 104 are shown, in other examples, each of the transmitter 108 and/or the receiver 110 can be a stand-alone circuit not being part of a larger transceiver circuit. In some examples, the transmitter and the receiver 110 can be part of one or more integrated circuits (ICs), such as application specific integrated circuits (ASICs) or programmable ICs, such as field programmable gate arrays (FPGAs).

The channel 116 can include an electrical or optical transmission medium. An electrical transmission medium can be any type of electrical path between the transmitter 108 and the receiver 110, which can include metal traces, vias, cables, connectors, decoupling capacitors, termination resistors, and the like. The electrical transmission medium can be a differential signal path, such as a low-voltage differential signal (LVDS) path. An optical transmission medium can be any type of optical path between the transmitter 108 and the receiver 110, which can include optical fibers, optical-to-electrical converters, electrical-to-optical converters, and the like.

In an example, the transmitter 108 transmits serialized data over the channel 116 using a digital baseband modulation, such as a binary non-return-to-zero (NRZ) modulation, multilevel pulse amplitude modulation (PAM-n), or the like. In NRZ modulation, each transmitted symbol comprises one bit. In multilevel PAM, each symbol comprises multiple bits. For example 4-level PAM (PAM4) includes four levels and can be used to transmit two-bit symbols. In general, the transmitter 108 transmits the serialized data as a sequence of symbols using a particular modulation scheme. There are two possible values for each symbol in NRZ modulation, and there are n possible values for each symbol in PAM-n modulation. The rate at which the transmitter 108 transmits the symbols is referred to as the symbol-rate or baud-rate.

In an example, the transmitter 108 does not transmit a reference clock with the data. The receiver 110 includes a clock data recovery (CDR) circuit 112 (or CDR 112) for extracting a clock from the incoming symbol stream. The extracted clock is used to sample the incoming symbol stream and recover the transmitted bits. As described herein, the CDR circuit 112 operates at the baud-rate, rather than oversampling the incoming symbol stream. As such, the CDR circuit 112 conserves power compared to oversampling CDR circuits. Further, the CDR circuit 112 can achieve optimal or near optimal sampling phase even as the channel loss profile changes.

Figure 2:
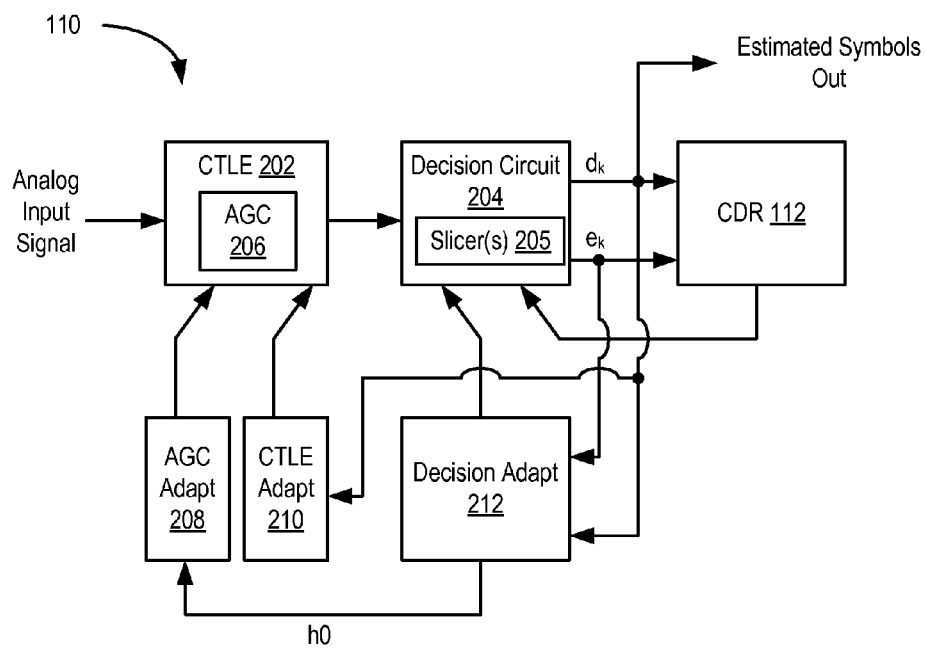
FIG. 2 is a block diagram depicting an example of receiver.

FIG. 2 is a block diagram depicting an example of the receiver 110. The receiver 110 includes a continuous time linear equalizer (CTLE) 202, a decision circuit 204, the CDR 112, an automatic gain control (AGC) adapt circuit 208, a CTLE adapt circuit 210, and a decision adapt circuit 212. The CTLE 202 can include an AGC circuit 206.

The CTLE 202 is coupled to receive an analog input signal from the channel 116. The channel 116 degrades the signal quality of the transmitted analog signal. Channel insertion loss is the frequency-dependent degradation in signal power of the analog signal. When signals travel through a transmission line, the high frequency components of the analog signal are attenuated more than the low frequency components. In general, channel insertion loss increases as frequency increases. In addition to channel insertion loss, signal pulse energy in the analog signal can be spread from one symbol period to another during propagation on the channel 116. The resulting distortion is known as inter-symbol interference (ISI). In general, ISI becomes worse as the speed of the communication system increases.

The CTLE 202 operates as a high-pass filter to compensate for the low-pass characteristics of the channel 116. The peak of the frequency response of the CTLE 202 can be adjusted by the CTLE adapt circuit 210. The AGC 206 controls the gain of the high-pass filter. The gain of the AGC 206 can be controlled by the AGC adapt circuit 208. The CTLE 202 outputs an equalized analog signal. While the CTLE 202 having the AGC 206 is shown, in other examples, the receiver 110 can include other types of continuous-time filters with or without amplification. Thus, in general, the receiver 110 filters the analog signal received from the channel 116 to generate an "equalized analog signal" using some type of continuous-time filter with or without amplification, such as the CTLE 202 shown in FIG. 2.

The decision circuit 204 is coupled to the CTLE 202 and receives the equalized analog signal. The decision circuit 204 is operable to sample the equalized analog signal to generate a data sample ($d_k$) and an error sample ($e_k$) per symbol (k). The decision circuit 204 samples the equalized analog signal at the baud-rate (symbol rate) to generate the data and error samples. The data samples comprise estimated values for the symbols, and the error samples comprise estimated decision errors for the symbols. The decision circuit 204 can include one or more slicers 205 that make symbol decisions from the equalized analog signal based on a sampling clock operating at the baud-rate. The decision adapt circuit 212 controls the decision threshold(s) of the slicer(s) 205. The CDR 112 controls the sampling phase of the slicer(s) 205. The decision adapt circuit 212 and the CDR 112 operate to minimize the values of the error samples.

The CDR 112 is coupled to the decision circuit 204 and receives the data and error samples. The CDR 112 generates both a timing error value and an estimated waveform value per symbol based on the data and error samples. The CDR 112 generates a control signal for adapting the sampling phase of the decision circuit 204 based on generated timing error values. The CDR 112 operates at the baud-rate (symbol rate). An example of the CDR 112 is described below with respect to FIG. 3.

The decision adapt circuit 212 is coupled to the decision circuit 204 and receives the data and error samples. The decision adapt circuit 212 generates a control signal to control the decision threshold(s) of the slicer(s) 205 based on the data and error samples. The decision adapt circuit 212 also generates a cursor-weight ($h_0$) for the main-cursor for each processed symbol, which is coupled to the AGC adapt circuit 208.

The CTLE adapt circuit 210 is coupled to the decision circuit 204 to receive the data samples. The CTLE adapt circuit 210 generates a control signal to adjust the peak frequency response of the CTLE 202. The AGC adapt circuit 208 is coupled to the decision adapt circuit 212 to receive the main cursor magnitude signal. The AGC adapt circuit 208 generates a control signal to adjust the gain of the AGC 206.

Figure 3:
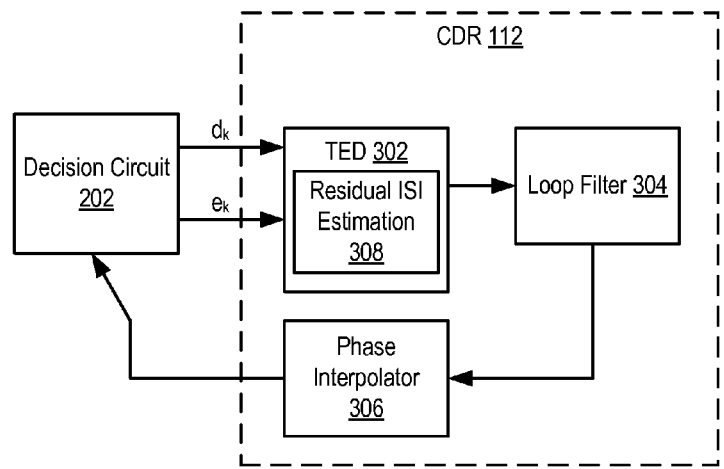
FIG. 3 is a block diagram depicting an example of a clock data recovery (CDR) circuit.

FIG. 3 is a block diagram depicting an example of the CDR 112. The CDR 112 includes a timing error detector (TED) 302, a loop filter 304, and a phase interpolator 306. The TED 302 is coupled to the decision circuit 204 and receives the data and error samples. The TED 302 implements a minimum mean square error (MMSE) estimator to generate timing error values. The TED 302 generates a timing error value, $\tau_k$, for each symbol, k. Each timing error value, $\tau_k$, is a product of the error sample for a previous symbol and the slope of the waveform of the equalized analog signal. In particular, the timing error value for the $k^{th}$ symbol can be defined as:

$$\tau_k = e_{k-1} * (y_k - y_{k-2}) \quad (1),$$

where $(y_k - y_{k-2})$ represents the slope of the waveform of the equalized analog signal, y is an estimated waveform value, k is the current symbol, and k−1 and k−2 are the two previous symbols. The values $y_k$ and $y_{k-2}$ are estimated waveform values for the $k^{th}$ and the $k-2^{nd}$ symbols, respectively.

To determine the timing error values, the TED 302 also generates an estimated waveform value, $y_k$ for each symbol, k. In an example, each estimated waveform value, $y_k$, is the sum of cursor components ("cursors") for the $k^{th}$ symbol. In particular, the estimated waveform value for the $k^{th}$ symbol can be defined as:

$$y_k = \Sigma_{i=-L}^{L} h_i * d_{k-i} \quad (2),$$

where $h_i * d_{k-i}$ are pre-cursor(s), main-cursor, and post-cursor(s) for the $k^{th}$ symbol. For L=1, each estimated waveform value, $y_k$, includes first pre-cursor, main-cursor, and first-post cursor. For each cursor, $d_{k-i}$ is the $(k-i)^{th}$ data sample and $h_i$ is a cursor-weight. For L=1, $h_{-1}$ is the cursor-weight of the first pre-cursor, $h_0$ is the cursor-weight of the main-cursor, and $h_1$ is the cursor-weight of the first post-cursor. The pre-cursor ($h_{-1} * d_{k+i}$) and the post-cursor ($h_1 * d_{k-1}$) represent the residual ISI for the $k^{th}$ symbol.

The TED 302 can include a residual ISI estimation circuit 308. In an example, the residual ISI estimation circuit 308 estimates the cursor-weights of the pre- and post-cursors (e.g., the residual ISI) by accumulating and filtering correlations among the data samples and the error samples. No feedback is required in the residual ISI estimation process. As such, the residual ISI estimation process used by the TED 302 is suited for high-speed, low-power applications. The estimation of the residual ISI is discussed below with respect to FIG. 4.

Equation (2) takes both pre-cursor(s) and post-cursor(s) into account, which results in more accurate timing error values. In another example, the TED 302 can set each $y_k$ equal to $d_k$, rather than implementing equation (2). This will result in simpler computation, but also degraded performance.

The loop filter 304 is coupled to the TED 302 and receives the timing error values. The loop filter 304 can implement a low-pass filter to smooth changes in the timing error values. The phase interpolator 306 is coupled to the loop filter 304 and receives filtered timing error values. The phase interpolator 306 is operable to generate a control signal for controlling the sampling phase of the decision circuit 204 in response to the filtered timing error values.

The CDR 112 drives the sampling phase to minimize the mean squared error at the decision circuit 204 regardless of the symmetry of the analog signal waveform. The decision circuit 204 is not required to oversample the equalized analog signal. The CDR 112 operates without the need for a high-speed analog-to-digital converter (ADC), digital feed forward equalizer (FFE), and digital decision feedback equalizer (DFE) in the receiver 110. As such, the CDR 112 achieves robust performance with low power consumption.

Figure 4:
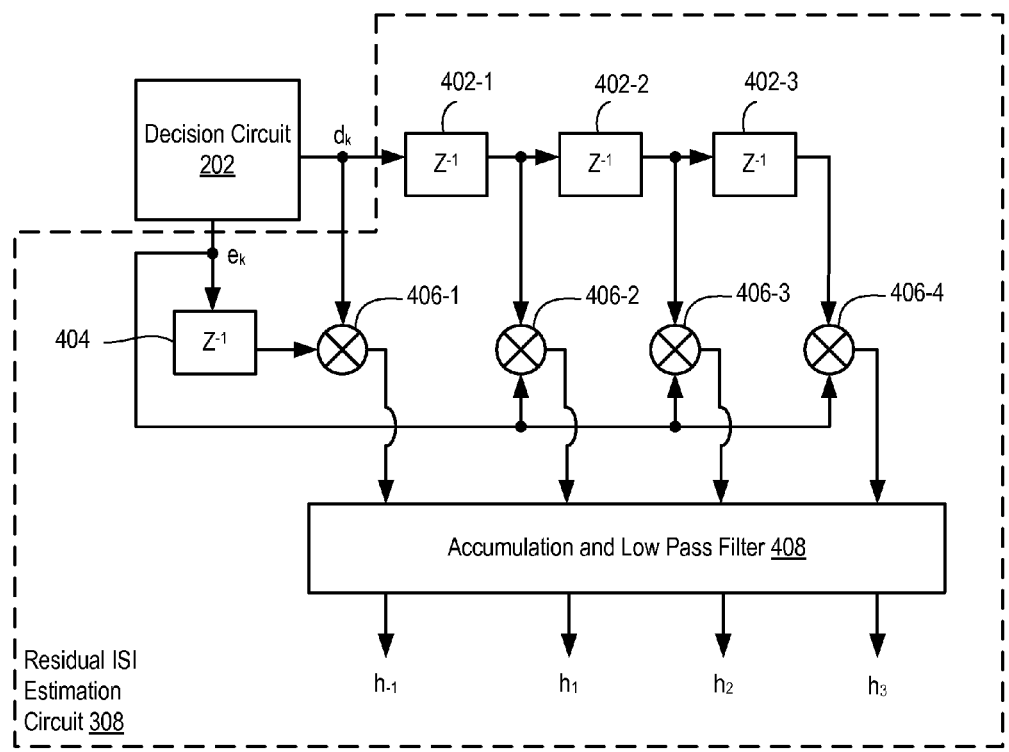
FIG. 4 is a block diagram depicting an example residual inter-symbol interference (ISI) estimation circuit.

FIG. 4 is a block diagram depicting an example residual ISI estimation circuit 308. The residual ISI estimation circuit 308 comprises a plurality of delay elements ($Z^{-1}$) 402, a delay element 404, a plurality of correlators 406, and an accumulation and low-pass filter circuit 408. In the example of FIG. 4, the plurality of delay elements 402 include three delay elements 402-1, 402-2, and 402-3, and the plurality of correlators 406 include four correlators 406-1, 406-2, 406-3, and 406-4.

An input of the delay element 402-1 is coupled to receive the data samples, $d_k$, from the decision circuit 204. An output of the delay element 402-1 is coupled to an input of the delay element 402-2. An output of the delay element 402-2 is coupled to an input of the delay element 402-3. Each of the delay elements 402 delays the data samples by one symbol period. Thus, the output of the delay element 402-1 is $d_{k-1}$, the output of the delay element 402-2 is $d_{k-2}$, and the output of the delay element 402-3 is $d_{k-3}$.

An input of the delay element 404 is coupled to receive the error samples, $e_k$, from the decision circuit 202. The delay element 404 delays the error samples by one symbol period. Thus, the output of the delay element 404 is $e_{k-1}$.

Inputs of the correlator 406-1 are coupled to the decision circuit 204 and the delay element 404 to receive the data sample, $d_k$, and the error sample, $e_{k-1}$, respectively. Inputs of the correlator 406-2 are coupled to the delay element 402-1 and the decision circuit 204 to receive the data sample, $d_{k-1}$, and the error sample, $e_k$, respectively. Inputs of the correlator 406-3 are coupled to the delay element 402-2 and the decision circuit 204 to receive the data sample, $d_{k-2}$, and the error sample, $e_k$, respectively. Inputs of the correlator 406-4 are coupled to the delay element 402-3 and the decision circuit 204 to receive the data sample, $d_{k-3}$, and the error sample, $e_k$, respectively.

Inputs of the accumulation and low-pass filter circuit 408 are coupled to outputs of the correlators 406. The accumulation and low-pass filter circuit 408 integrates and smoothes the correlator outputs to generate the cursor-weights $h_{-1}$, $h_1$, $h_2$, and $h_3$ for the first pre-cursor and the first, second, and third post-cursors, respectively. The residual ISI estimation circuit 308 can be scaled to generate cursor-coefficients for any number of post-cursors in a similar manner.

The residual ISI estimation circuit 308 determines the pre- and post-cursor weights without the need for an ADC and DFE in the receiver 110. The residual ISI estimation circuit 308 estimates the residual ISI by accumulating and low pass filtering the correlations among the data samples and the error samples. As such, no feedback is needed in the estimation. The residual ISI estimation circuit 308 is suited for use in high-speed, low-power applications.

Figure 5:
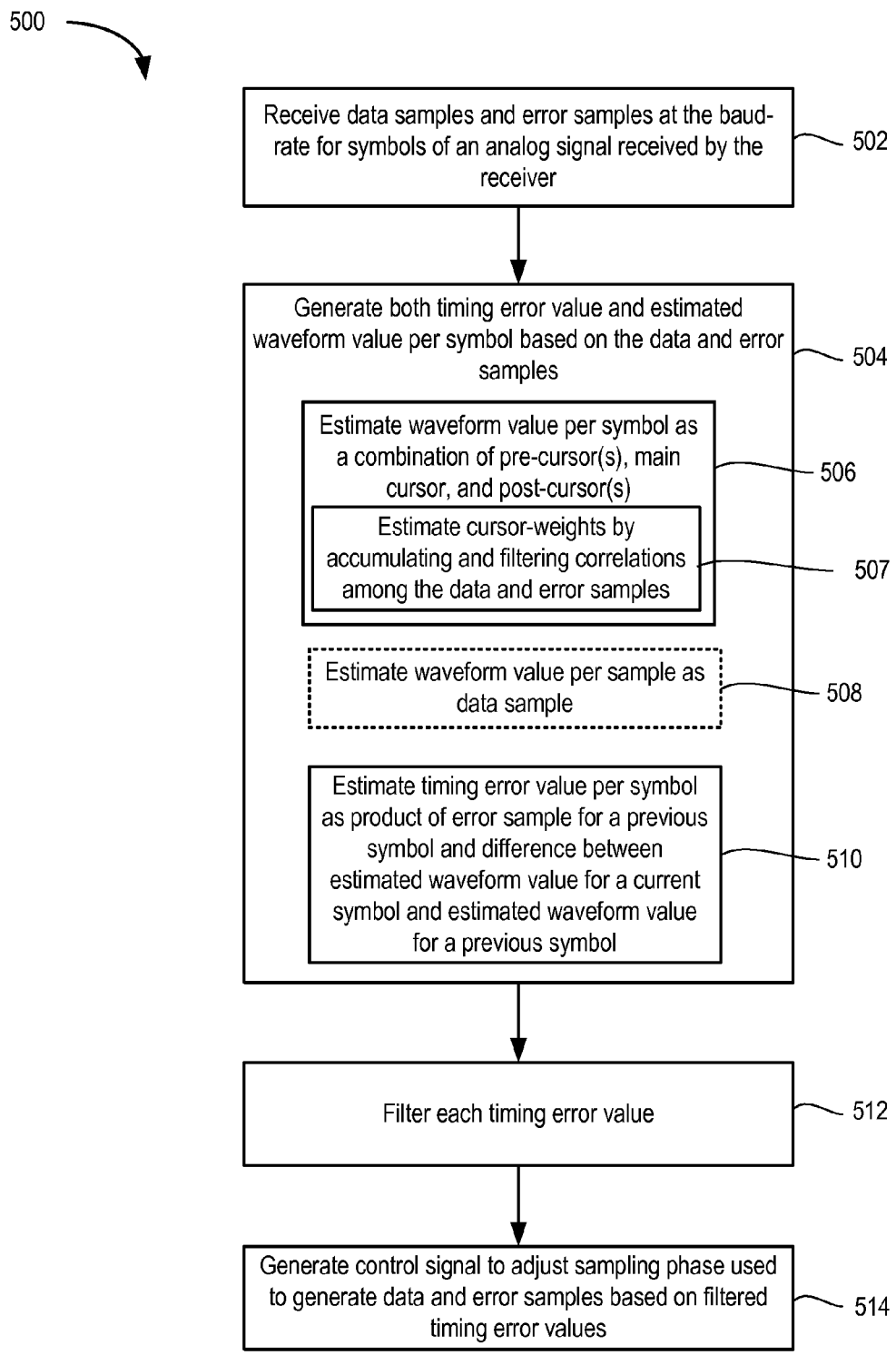
FIG. 5 is a flow diagram depicting an example of a method of clock data recovery in a receiver.

FIG. 5 is a flow diagram depicting an example of a method 500 of clock data recovery in a receiver. The method 500 can be performed by the CDR 112 in the receiver 110 described above. The method 500 begins at operation 502, where the CDR 112 receives data samples and error samples at the baud-rate for symbols of an analog signal received by the receiver 110. As discussed above, the CDR 112 operates at the baud-rate and does not require oversampling of the received analog signal.

At operation 504, the CDR 112 generates both a timing error value and an estimated waveform value per symbol based on the data and error samples. In an example, at operation 506, the CDR 112 can estimate a waveform value per symbol as a combination of pre-cursor(s), main-cursor, and post-cursor(s). At operation 507, the CDR 112 can estimate cursor-weights by accumulating and filtering correlations among the data and error samples. As such, the CDR 112 estimates and accounts for the residual ISI when computing each estimated waveform value. The CDR 112 performs the residual ISI estimation without feedback, as described in the examples above. In another example, rather than perform operation 506, the CDR 112 can perform operation 508, where the waveform value per symbol is equal the corresponding data sample. This simplifies the computation, but degrades performance since the residual ISI is not considered. At operation 510, the CDR 112 estimates a timing error value per symbol as a product of an error sample for a previous symbol and a difference between an estimated waveform value for a current symbol and an estimated waveform value for a previous symbol. That is, the CDR 112 can estimate a timing error value as a product of an error sample for a previous symbol and a slope of the waveform as computed using waveform values determined from operation 506 or 508.

At operation 512, the CDR 112 filters each timing error value. At operation 514, the CDR 112 generates a control signal to adjust sampling phase used to generate the data and error samples based on the filtered timing error values. The CDR 112 drives the sampling phase to minimize the mean squared error at the decision circuit 204 regardless of the symmetry of the analog signal waveform.

Figure 6:
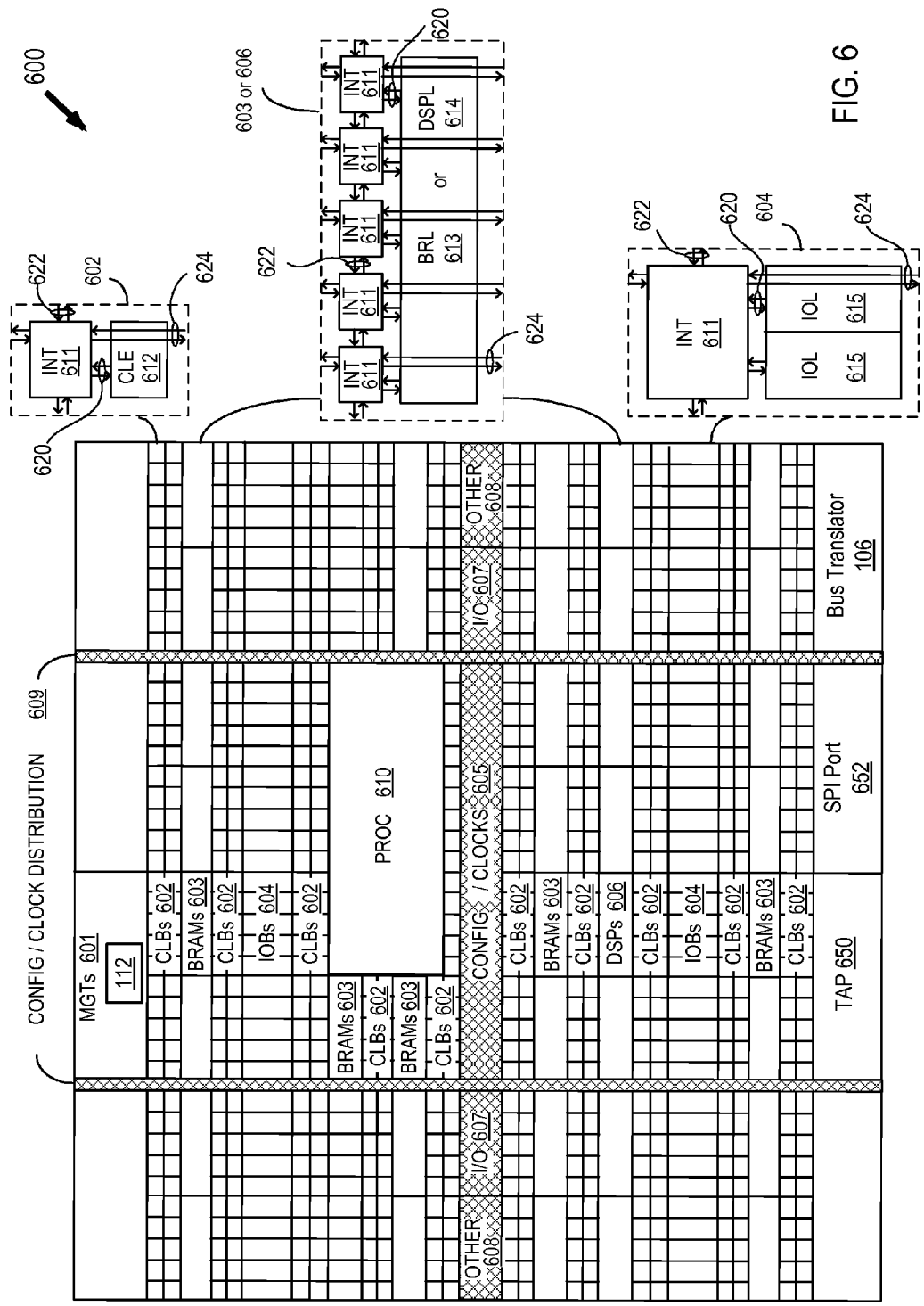
FIG. 6 is a block diagram depicting an example FPGA architecture.

The CDR 112 described herein can be used in serial receivers or transceivers disposed in an IC, such as an FPGA. FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile can include at least one programmable interconnect element ("INT") 611 having connections to input and output terminals 620 of a programmable logic element within the same tile, as shown by examples included at the top of FIG. 6. Each programmable interconnect element 611 can also include connections to interconnect segments 622 of adjacent programmable interconnect element(s) in the same tile or other tile(s). Each programmable interconnect element 611 can also include connections to interconnect segments 624 of general routing resources between logic blocks (not shown). The general routing resources can include routing channels between logic blocks (not shown) comprising tracks of interconnect segments (e.g., interconnect segments 624) and switch blocks (not shown) for connecting interconnect segments. The interconnect segments of the general routing resources (e.g., interconnect segments 624) can span one or more logic blocks. The programmable interconnect elements 611 taken together with the general routing resources implement a programmable interconnect structure ("programmable interconnect") for the illustrated FPGA.

In an example implementation, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 606 can include a DSP logic element ("DSPL") 614 in addition to an appropriate number of programmable interconnect elements. An 10B 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured example, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs. The processor block 610 can various components ranging from a single microprocessor to a complete programmable processing system of microprocessor(s), memory controllers, peripherals, and the like.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, one or more of the MGTs 601 can include the CDR 112 for clock recovery. As discussed above, the CDR 112 operates at the baud-rate and does not require oversampling of the input analog signal. As such, the CDR 112 consumes less power, reducing the overall power consumption of the MGTs 601 and the FPGA 600. Further, the CDR 112 drives the sampling phase to minimize the mean squared error of the symbol decisions regardless of the symmetry of the analog signal waveform. The CDR 112 operates without the need for a high-speed ADC, digital FFE, and digital DFE, which further reduces power consumption of the MGTs 601 and the FPGA 600. As such, the CDR 112 achieves robust performance with low power consumption.

While the foregoing is directed to specific examples, other and further examples may be devised without departing from the basic scope thereof, and the scope thereof is determined by the claims that follow.

What is claimed is:

1. A clock data recovery (CDR) circuit for a receiver, comprising:
   a timing error detector circuit coupled to receive, at a baud-rate, data samples and error samples for symbols received by the receiver, the timing error detector circuit operable to generate both a timing error value and an estimated waveform value per symbol based on the data samples and the error samples;

a loop filter coupled to the timing error detector to receive timing error values; and a phase interpolator coupled to the loop filter to receive filtered timing error values, the phase interpolator operable to generate a control signal to adjust a sampling phase used to generate the data samples and the error samples.

2. The CDR circuit of claim 1, wherein the data samples and the error samples are samples of an analog signal output by a continuous-time equalizer.

3. The CDR circuit of claim 1, wherein the estimated waveform value per symbol comprises a combination of at least one pre-cursor, a main cursor, and at least one post-cursor.

4. The CDR circuit of claim 3, wherein the timing error value per symbol comprises a product of an error sample for a previous symbol and a difference between an estimated waveform value for a current symbol and an estimated waveform value for a previous symbol.

5. The CDR circuit of claim 3, wherein the timing error detector comprises:
   a residual inter-symbol interference (ISI) estimation circuit operable to generate cursor-weights per symbol by accumulating and filtering correlations between the data samples and the error samples.

6. The CDR circuit of claim 5, wherein the residual ISI estimation circuit comprises:
   a plurality of data delay elements operable to output delayed data samples;
   an error delay element operable to output a delayed error sample;
   a plurality of correlators operable to output a plurality of correlations comprising a correlation between a current data sample and the delayed error sample and respective correlations between the delayed data samples and a current error sample; and
   an accumulation and low-pass filter circuit operable to generate the cursor-weights based on the plurality of correlations.

7. The CDR circuit of claim 6, wherein the plurality of data delay elements comprises three data delay elements, wherein the plurality of correlators comprises four correlators, and wherein the accumulation and low-pass filter is operable to generate a pre-cursor weight for a first pre-cursor and post-cursor weights for first, second, and third post-cursors.

8. The CDR circuit of claim 1, wherein the estimated waveform value per symbol comprises a data sample for a current symbol.

9. The CDR circuit of claim 7, wherein the timing error value per symbol comprises a product of an error sample for a previous symbol and a difference between an estimated waveform value for a current symbol and an estimated waveform value for a previous symbol.

10. A receiver, comprising:
    a continuous-time equalizer circuit coupled to receive an analog signal from a channel;
    a decision circuit coupled to receive an equalized analog signal from the continuous-time equalizer and to generate data samples and error samples of the equalized analog signal at a baud-rate of symbols of the analog signal; and
    a clock data recovery (CDR) circuit, comprising:
       a timing error detector circuit coupled to receive the data samples and the error samples, the timing error detector circuit operable to generate both a timing error value and an estimated waveform value per symbol of the analog signal based on the data samples and the error samples;
       a loop filter coupled to the timing error detector to receive timing error values; and
       a phase interpolator coupled to the loop filter to receive filtered timing error values, the phase interpolator operable to provide a control signal to the decision circuit for adjusting a sampling phase used to generate the data samples and the error samples.

11. The receiver of claim 10, wherein the estimated waveform value per symbol comprises a combination of at least one pre-cursor, a main cursor, and at least one post-cursor.

12. The receiver of claim 11, wherein the timing error value per symbol comprises a product of an error sample for a previous symbol and a difference between an estimated waveform value for a current symbol and an estimated waveform value for a previous symbol.

13. The receiver of claim 11, wherein the timing error detector comprises:
    a residual inter-symbol interference (ISI) estimation circuit operable to generate cursor-weights per symbol by accumulating and filtering correlations between the data samples and the error samples.

14. The receiver of claim 13, wherein the residual ISI estimation circuit comprises:
    a plurality of data delay elements operable to output delayed data samples;
    an error delay element operable to output a delayed error sample;
    a plurality of correlators operable to output a plurality of correlations comprising a correlation between a current data sample and the delayed error sample and respective correlations between the delayed data samples and a current error sample; and
    an accumulation and low-pass filter circuit operable to generate the cursor-weights based on the plurality of correlations.

15. The receiver of claim 10, wherein the estimated waveform value per symbol comprises a data sample for a current symbol.

16. The receiver of claim 15, wherein the timing error value per symbol comprises a product of an error sample for a previous symbol and a difference between an estimated waveform value for a current symbol and an estimated waveform value for a previous symbol.

17. A method of clock data recovery (CDR) for a receiver, comprising:
    receiving, at a baud-rate, data samples and error samples for symbols of an analog signal received by the receiver;
    generating both a timing error value and an estimated waveform value per symbol based on the data samples and the error samples;
    filtering each timing error value; and
    generating a control signal to adjust sampling phase used to generate the data samples and the error samples based on filtered timing error values.

18. The method of claim 17, wherein the operation of generating the estimated waveform value per symbol comprises:
    determining a combination of at least one pre-cursor, a main cursor, and at least one post-cursor.

19. The method of claim 18, wherein the operation of generating the estimated waveform value per symbol further comprises:

generating cursor-weights per symbol by accumulating and filtering correlations between the data samples and the error samples.

20. The method of claim 18, wherein the operation of generating the timing error value per symbol comprises:
determining a difference between an estimated waveform value for a current symbol and an estimated waveform value for a previous symbol; and
determining a product of an error sample for a previous symbol and the difference.

* * * * *